Figure 1:
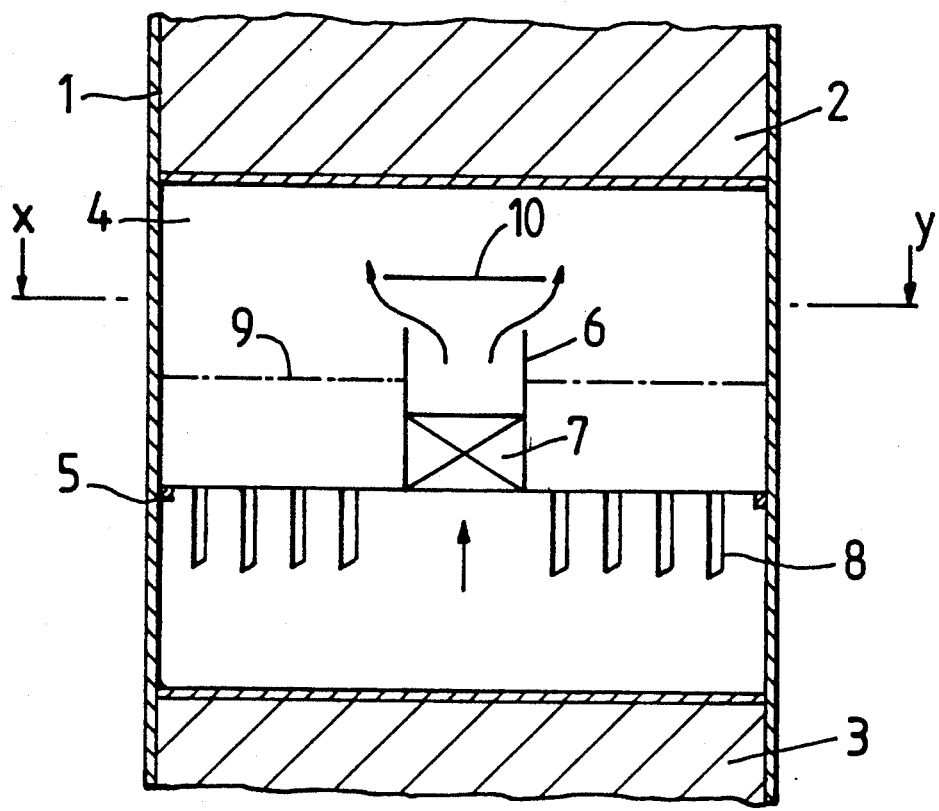

United States Patent [19]
Reay et al.

[11] Patent Number: 5,145,612
[45] Date of Patent: Sep. 8, 1992

[54] APPARATUS FOR MIXING VAPOR IN A COUNTERCURRENT COLUMN

[75] Inventors: Derek W. Reay; Stuart Fraser, both of Berkshire; Richard G. Heddle, Camberley, all of England

[73] Assignee: The British Petroleum Company p.l.c., London, United Kingdom

[21] Appl. No.: 704,903

[22] Filed: May 21, 1991

Related U.S. Application Data

[63] Continuation of Ser. No. 417,959, Oct. 5, 1989, abandoned.

[30] Foreign Application Priority Data

Oct. 8, 1988 [GB] United Kingdom ................. 8823671

[51] Int. Cl.$^5$ ............................................... B01F 3/04
[52] U.S. Cl. ................................... 261/79.2; 261/96; 261/97
[58] Field of Search ........................... 261/96, 97, 79.2

[56] References Cited

U.S. PATENT DOCUMENTS

| | | | |
|---|---|---|---|
| 1,113,643 | 10/1914 | Jonas | 261/96 |
| 3,006,623 | 10/1961 | Ross et al. | 261/97 |
| 3,259,380 | 7/1966 | Brown | 261/97 |
| 3,345,046 | 10/1967 | Versluys et al. | 261/79.2 |
| 3,556,737 | 1/1971 | Boyd | 261/97 |
| 4,349,360 | 9/1982 | Schuurmans et al. | 261/79.2 |
| 4,427,605 | 1/1984 | Meier et al. | 261/97 |
| 4,752,307 | 6/1988 | Asmus et al. | 261/97 |
| 4,838,906 | 6/1989 | Kiselev | 261/79.2 |
| 4,880,451 | 11/1989 | Konijn | 261/79.2 |

FOREIGN PATENT DOCUMENTS

| | | |
|---|---|---|
| 1113680 | 9/1961 | Fed. Rep. of Germany ........ 261/97 |
| 2062489 | 5/1981 | United Kingdom . |

*Primary Examiner*—Tim Miles
*Attorney, Agent, or Firm*—David J. Untener; Larry W. Evans

[57] ABSTRACT

The efficiency of mixing vapor in a countercurrent column (1) is improved by use of one or more vapor risers (6) each incorporating a mixing device (7). The method is suitable for use in countercurrent columns operating at high pressures or under vacuum. For high pressure operation a single riser is preferred positioned in the center of the distributor tray (5).

7 Claims, 1 Drawing Sheet

APPARATUS FOR MIXING VAPOR IN A COUNTERCURRENT COLUMN

This is a continuation of co-pending application Ser. No. 07/417,959 filed on Oct. 5, 1989, now abandoned.

This invention relates to an apparatus and method for the mixing of vapour in a countercurrent column.

Countercurrent columns can be used for effecting separations of liquid and vapour mixtures into their individual components, for example in distillation.

Such columns provide a means for establishing an equilibrium between the ascending vapour and descending liquid.

The contact between the vapour and liquid may occur in discrete steps as in conventional plate columns or in beds of suitable random or structured packing materials.

In packed columns the vapour-liquid contacting takes place in a continuous bed of packing material.

Such columns may be subdivided into a number of exchange zones the spaces between which contain devices for distributing both the liquid and vapour to the adjacent packing zones.

The efficiency of such columns comprising a number of exchange sections depends upon the liquid and vapour being distributed uniformly across the surface of the exchange section.

In some conventional column tray devices are used for distributing the liquid and vapour. These comprise a number of ducts situated in the base of the device through which both liquid and vapour flow countercurrently.

In another known device disclosed in U.K. Patent Specification 2062489 the distributor tray has a number of risers for the passage of vapour and a number of separate tubes dispersed between the risers for the discharge of liquid.

In a multiple riser system vapour from each riser may have a different concentration gradient. Although vapour from adjacent risers will mix to a limited degree, vapour from adjacent groups of risers will not.

We have now found that the use of one or more vapour risers incorporating a mixing device ensures the more complete mixing of the mass of vapour leaving the packed bed below the tray.

Thus according of the present invention there is provided a device for collecting and distributing liquid and vapour in a countercurrent column which is subdivided into a number of exchange zones which device comprises a distributor tray having one or more risers for the passage of vapour situated in the base of the tray, each riser having a cover means and mix imparting means arranged therein, and a number of tubes for liquid discharge dispersed in the base of the tray arranged around said vapour risers.

The device of the present invention provides a more uniform vapour concentration profile to the exchange bed above the distributor tray.

The total cross-section of the risers is typically in the range 2-50% of the cross-section of the distributor tray depending upon the operating pressure of the column.

The cover fitted to each riser may take the form of an inverted cone or preferably a flat plate attached to the top of the riser by a number of legs. The cover prevents liquid from the bed above from passing down the riser.

If required the cover can be arranged to provide means for laterally distributing the vapour in a uniform manner. For example vanes may be provided to ensure the vapour is distributed uniformily around the periphery of the riser.

Suitable mixing of the vapour can be achieved by incorporating a static mixing device, such as swirl vanes, in each vapour riser. This ensures thorough mixing of the vapour as it passes up through the riser.

The present invention is suitable for countercurrent columns operating at high pressure for example 20-30 bar or under vacuum.

For operation at high pressure a single riser is preferred. This is preferably situated in the centre of the distributor tray.

For operation under vacuum a number of risers may be necessary to meet the requirements of the pressure drop and possible space limitations. In this situation the risers will normally be equi-spaced in a conventional manner.

The device is particularly suitable for use in the separation of light hydrocarbons.

The device is suitable for operating under loads normally associated with processes of this kind.

Passage of liquid through the distributor tray may be by means of conventional discharge tubes situated in the base of the tray or by tubes projecting above the level of the liquid.

Thus according to another aspect of the present invention there is provided a method for the passage of vapour by means of a distributor tray in a countercurrent column subdivided into a number of exchange zones which method comprises passing the vapour received from the exchange zone below the tray through one or more risers situated in the base of the tray, each riser being fitted with a cover means and incorporating mix imparting means, and allowing the vapour to pass into the exchange zone above the tray.

Figure 2:
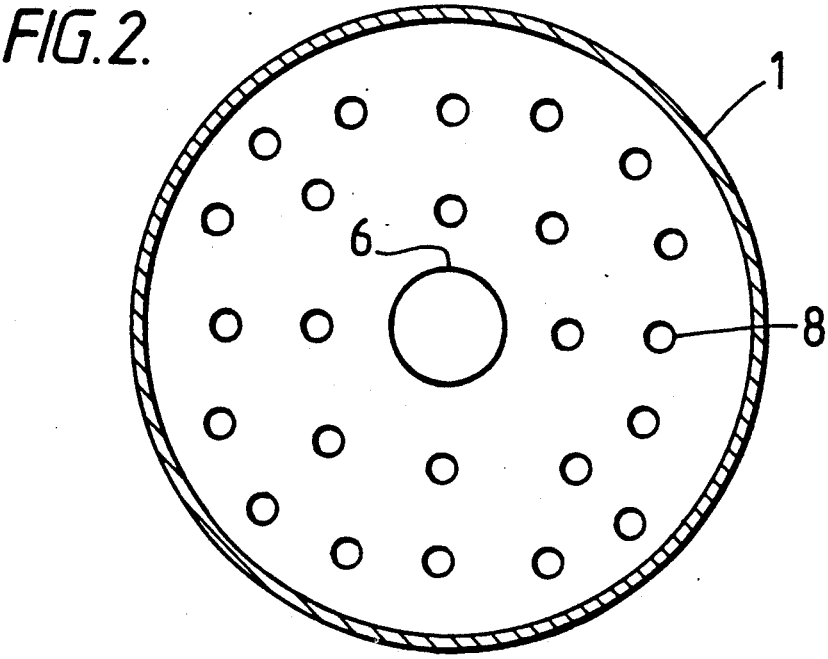

The invention will be described with reference to the accompanying drawings in which:

FIG. 1 is a diagrammatic view in longitudinal section showing part of a countercurrent column, FIG. 2 is a plan cross section along the line X-Y of FIG. 1.

FIG. 1 shows the column 1 having exchange zones 2 and 3 containing for example Raschig-rings as packing material. The exchange zones are separated by the area 4 which contains the distributor tray 5. In this case this consists of a single riser 6, situated in the centre of the tray, incorporating a swirl vane mixing device 7 and liquid discharge tubes 8 disposed in the base of the tray. The riser protrudes above the liquid level 9 in the tray and at its upper end is fitted with a cap in the form of the flat plate 10.

FIG. 2 shows the arrangement of both the riser 6 and liquid discharge tubes 8 in the base of the distributor tray.

We claim:

1. A method for mixing of vapor in a column that provides countercurrent contact between said liquid and said vapor, comprising passing the vapor received from an exchange zone below a distributor tray through one or more risers situated in the base of the tray, each riser being fitted with cover means and incorporating mix imparting means, said mix imparting means providing mixing of said vapor within the riser, and allowing the vapor to pass into an exchange zone above the tray.

2. A device for collecting and distributing liquid and vapor in a column that provides countercurrent contact between said liquid and said vapor, which is subdivided into a number of exchange zones comprising a distributor tray having one or more risers for the passage of vapor situated in the base of the tray, each riser having a cover means and mix imparting means arranged therein, said mix imparting means providing mixing of said vapor within the riser, and a number of tubes for liquid discharge dispersed in the base of the tray arranged around said vapor risers.

3. A device according to claim 2 wherein the cover means is a flat plate attached to the top of each riser by a number of legs.

4. A device according to claim 2 wherein the mix imparting means is a static mixing device.

5. A device according to claim 4 wherein the static mixing device comprises swirl vanes situated in each riser.

6. A device according to claim 2 wherein the number of risers is one.

7. A device according to claim 6 wherein the riser is situated in the centre of the tray.

* * * * *